*Ray & Young,*
*Cultivator.*

No. 95,044. Patented Sep. 21, 1869.

Witnesses.
Wm. F. Clark
Frank Blockley

Inventor.
J. T. Ray & J. R. Young.

per
Attorneys.

UNITED STATES PATENT OFFICE.

JOHN J. RAY AND JAMES R. YOUNG, OF NEW ORLEANS, LOUISIANA.

IMPROVEMENT IN CULTIVATING-HOES.

Specification forming part of Letters Patent No. 95,044, dated September 21, 1869.

*To all whom it may concern:*

Be it known that we, JOHN J. RAY and JAMES R. YOUNG, of New Orleans, in the parish of Orleans and State of Louisiana, have invented a new and Improved Cultivating-Hoe; and we do hereby declare that the following is a full, clear, and exact description thereof, which will enable others skilled in the art to make and use the same, reference being had to the accompanying drawings, forming part of this specification.

The object of this invention is to provide a simple and efficient scraping or cultivating hoe for cutting weeds and turning the earth up around the roots of plants growing in rows, and adapted to be drawn by horses or other animals.

The invention consists in the arrangement of a pair of scraping-blades, of wood or metal, to work on the ground in an edgewise position, in the form of two sides of a triangle cut off at some distance from the apex, and connected by framing that will allow the said blades to work on each side of the row without disturbing the standing plants, the ends most widely separated being drawn foremost, to gather the earth and turn it up in a double ridge against the rows of plants. Near the bottom, inside, the blades are provided with laterally-projecting cutters to sever the weeds, and wheels are placed at the front ends, on which the frame may be tilted to be moved from one row to the other.

Figure 1:
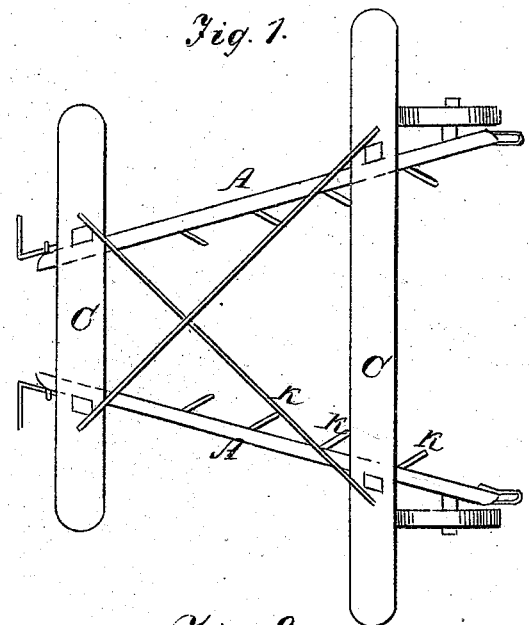
Figure 2:
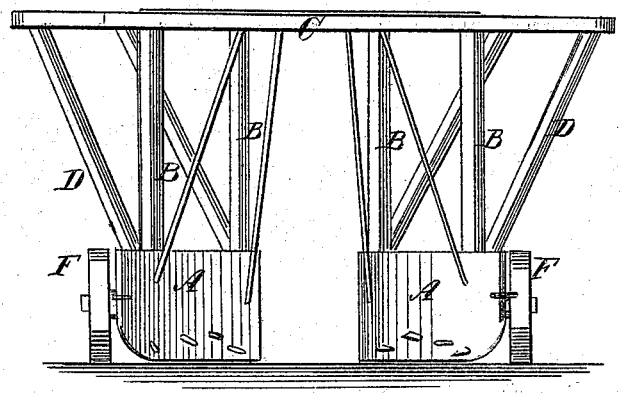

Figure 1 represents a plan view of our improved cultivating apparatus, and Fig. 2 represents a front view of the same.

Similar letters of reference indicate corresponding parts.

A represents the blades or scrapers, made of boards and supported relatively to each other by vertical posts B, cross-beams C, and braces D, so as to represent two sides of a triangle cut off near the apex, making a passage thereat, between the ends of the said plates, wide enough for the rows of plants, along which the scrapers are drawn, one on each side, to escape without injury by the said scrapers.

K represents cutters projecting from the inside of these scrapers, near the bottom, for cutting weeds.

F represents wheels, which may be applied to the front ends of the scrapers, on which they may be tilted by the attendant, to be supported while turning from one row into another.

This apparatus is drawn with the widest end forward, and with one blade or scraper on each side of the row, and gathers the top soil and turns it up against the roots of the plants in a very efficient manner. It is intended to be drawn by two horses, one on each side of the row.

Having thus described our invention, we claim as new and desire to secure by Letters Patent—

The blades A, connected and supported by posts, braces, and transverse beams in the angular arrangement described, and provided with weed-cutters and wheels, all substantially as specified.

J. J. RAY.
JAS. R. YOUNG.

Witnesses:
JOHN ROY,
F. M. MOHRMANN.